(12) United States Patent  
Emo

(10) Patent No.: US 7,042,668 B1
(45) Date of Patent: May 9, 2006

(54) METHOD AND APPARATUS FOR GENERATING AN INDEX LOCATION FROM A SPIN MOTOR OF A DISK DRIVE

(75) Inventor: Bruce Emo, Boulder, CO (US)

(73) Assignee: Maxtor Corporation, Longmont, CO (US)

( * ) Notice: Subject to any disclaimer, the term of this patent is extended or adjusted under 35 U.S.C. 154(b) by 290 days.

(21) Appl. No.: 10/010,703

(22) Filed: Nov. 7, 2001

Related U.S. Application Data

(60) Provisional application No. 60/246,387, filed on Nov. 7, 2000.

(51) Int. Cl.
*G11B 5/00* (2006.01)

(52) U.S. Cl. .................. 360/51; 360/73.03; 360/78.14; 360/77.08; 360/75; 360/72.1; 318/138; 318/254; 318/560

(58) Field of Classification Search ............ 360/73.03, 360/72.1, 77.04, 77.08, 78.14, 75, 51; 318/560, 318/618, 138, 254
See application file for complete search history.

(56) References Cited

U.S. PATENT DOCUMENTS

| | | | |
|---|---|---|---|
| 5,028,852 A | 7/1991 | Dunfield | 318/254 |
| 5,254,914 A | 10/1993 | Dunfield et al. | 318/254 |
| 5,258,695 A | 11/1993 | Utenick et al. | 318/138 |
| 5,408,153 A * | 4/1995 | Imai et al. | 310/68 B |
| 5,442,266 A | 8/1995 | Morehouse et al. | 318/272 |
| 5,466,997 A | 11/1995 | Utenick et al. | 318/254 |
| 5,495,368 A | 2/1996 | Blatchley et al. | 360/46 |
| 5,530,326 A | 6/1996 | Galvin et al. | 318/254 |
| 5,532,926 A | 7/1996 | Dunn et al. | 364/178 |
| 5,569,990 A | 10/1996 | Dunfield | 318/254 |
| 5,729,399 A | 3/1998 | Albrecht et al. | 360/75 |
| 5,767,643 A | 6/1998 | Pham et al. | 318/439 |
| 5,821,713 A | 10/1998 | Holling et al. | 318/439 |
| 5,825,145 A | 10/1998 | Pham et al. | 318/439 |
| 5,946,155 A * | 8/1999 | Tochiyama | 360/74.4 |
| 5,982,571 A | 11/1999 | Calfee et al. | 360/70 |
| 5,995,314 A * | 11/1999 | Furuki et al. | 360/73.03 |
| 6,229,663 B1 | 5/2001 | Yoneda et al. | 360/75 |
| 6,369,541 B1 | 4/2002 | Albert | 318/560 |
| 6,560,054 B1 * | 5/2003 | Ottesen et al. | 360/51 |

* cited by examiner

*Primary Examiner*—David Hudspeth
*Assistant Examiner*—Natalia Figueroa
(74) *Attorney, Agent, or Firm*—Tejpal S. Hansra

(57) ABSTRACT

A method and apparatus for generating an index location from a spin motor of a disk drive are disclosed. A disk drive includes a motor having a plurality of commutation states, wherein changes in commutation states are controlled by an FCOM signal having FCOM pulses. Ideally, when the motor is spinning at a constant speed, the time between FCOM pulses is constant. However, the inventor of the present invention has recognized that, in practice, the time between FCOM pulses, when measured more closely, is not constant due to mechanical tolerances in the motor. Accordingly, the inventor has determined that the non-constant times between FCOM pulses can be advantageously used to generate a spin motor index in a disk drive. Once obtained, the spin motor index may advantageously be used for a number of purposes.

37 Claims, 6 Drawing Sheets

METHOD AND APPARATUS FOR GENERATING AN INDEX LOCATION FROM A SPIN MOTOR OF A DISK DRIVE

CROSS-REFERENCE TO RELATED APPLICATION

Priority is claimed from U.S. Provisional Patent Application Ser. No. 60/246,387 filed Nov. 7, 2000, which is incorporated by reference herein in its entirety.

FIELD OF THE INVENTION

The present invention relates to computer disk drives. More particularly, the present invention relates to a method and apparatus for generating an index location from a spin motor of a disk drive.

BACKGROUND OF THE INVENTION

Computer disk drives store information on magnetic disks. Typically, the information is stored on each disk in concentric tracks, divided into sectors. Information is written to and read from a disk by a transducer (or head), which is mounted on an actuator arm capable of moving the transducer radially over the disk. Accordingly, the movement of the actuator arm allows the transducer to access different tracks. The disk is rotated by a spindle motor at a high speed, allowing the transducer to access different sectors on the disk. The transducer may include separate or integrated read and write elements.

A diagrammatic representation of a conventional disk drive, generally designated 10, is illustrated in FIG. 1. The disk drive comprises a disk 12 that is rotated by a spindle motor 14. The spindle motor 14 is mounted to a base plate 16. An actuator arm assembly 18 is also mounted to the base plate 16. The disk drive 10 also includes a cover (not shown) that is coupled to the base plate 16 and encloses the disk 12 and actuator arm assembly 18.

The actuator arm assembly 18 includes a flexure arm 20 attached to an actuator arm 22. A transducer 24 is mounted near the end of the flexure arm 20. The transducer 24 is constructed to magnetize the disk 12 and to sense the magnetic field emanating therefrom. The actuator arm assembly 18 pivots about a bearing assembly 26 that is mounted to the base plate 16.

Attached to the end of the actuator arm assembly 18 is a magnet 28 located between a pair of coils 30. The magnet 28 and coils 30 are commonly referred to as a voice coil motor 32 (VCM). The spindle motor 14, transducer 24 and VCM 32 are coupled to a number of electronic circuits 34 mounted to a printed circuit board 36, which comprise the control electronics of the disk drive 10. The electronic circuits 34 typically include a read channel chip, a microprocessor-based controller and a random access memory (RAM) device.

The disk drive 10 typically includes a plurality of disks 12 and, therefore, a plurality of corresponding transducers 24 mounted to flexure arms 20 for the top and bottom of each disk surface. However, it is also possible for the disk drive 10 to include a single disk 12 as shown in FIG. 1.

FIG. 2 is a diagrammatic representation of a simplified top view of a disk 12 having a surface 42 which has been formatted to be used in conjunction with a conventional sectored servo system (also known as an embedded servo system), as will be understood by those skilled in the art. As illustrated in FIG. 2, the disk 12 includes a plurality of concentric tracks 44a–44g for storing data on the disk's surface 42. Although FIG. 2 only shows a relatively small number of tracks (i.e., 7) for ease of illustration, it should be appreciated that typically many thousands of tracks are included on the surface 42 of a disk 12.

Each track 44a–44g is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to near its outer diameter 54). The servo sectors 48 are used to position the transducer 24 associated with each disk surface 42 during operation of the disk drive 10. The data sectors 46 are used to store customer data. Servo sectors 48 contain information relating to both their radial location and circumferential location on the disk surface 42.

As is well known to those skilled in the art, servo sectors 48 are written during a servo track writing process. In the servo track writing process, a clock head is used to write a clock track on the disk surface 42. The clock track includes a clock track index, which is used as an initial circumferential reference point on the disk surface 42.

Servo sectors 48 are written onto the disk surface 42 relative to the clock track index (in their circumferential sense), so that they form the servo wedges 50 described above. Since the clock track index is only used during the servo writing process, a servo sector index is created to designate a circumferential position on the disk surface (e.g., sector 0 for each of the tracks). It should be understood that the servo sector index is not necessarily located at the same position as the clock head index, but may be some predefined (but arbitrary) circumferential distance therefrom.

Since information relating to the radial and circumferential position of a servo sector is located in the servo sector itself, such information may only be obtained when a transducer flies proximate to the servo sector. Thus, the location of the servo sector index may only be obtained when the transducer is flying over (or under) servo sectors.

There are instances, however, when transducers are not flying over (or under) servo sectors. In such cases, a servo sector index relating to a circumferential position on the disk surface 42 is generally not available.

Referring again to FIG. 1, the flexure arm 20 is manufactured to have a bias such that if the disk 12 is not spinning, the transducer 24 will come into contact with the disk surface 42. When the disk is spinning, the transducer 24 typically moves above, or below, the disk surface at a very close distance, called the fly height. This distance is maintained by the use of an air bearing, which is created by the spinning of the disk 12 such that a boundary layer of air is compressed between the spinning disk surface 42 and the transducer 24. The flexure arm 20 bias forces the transducer 24 closer to the disk surface 42, while the air bearing forces the transducer 24 away from the disk 12 surface. Thus, the flexure arm 20 bias and air bearing act together to maintain the desired fly height when the disk 12 is spinning.

If the disk 12 is not spinning at a requisite rate, the air bearing produced under the transducer 24 may not provide enough force to prevent the flexure arm 20 bias from forcing the transducer 24 to contact the disk surface 42. If the transducer 24 contacts an area on the disk 12 surface that contains data, some of the data may be lost. To avoid this, the actuator arm assembly 18 is generally positioned such that the transducer 24 does not contact a data-containing area of the disk surface 42 when the disk 12 is not spinning, or when the disk 12 is not spinning at a sufficient rate to maintain an air bearing.

With reference again to FIG. 2, the disk surface 42 includes a landing zone 56 where no data or servo information is stored and, therefore, where no servo sector index information is available. As will be understood by those skilled in the art, the landing zone 56 is where a transducer 24 of a contact start/stop disk drive will land when the drive is powered down. Furthermore, in the case of a load/unload drive, the landing zone 56 is an area that is reserved (for safety-sake) for the transducer 24 to contact when being loaded onto and unloaded from the disk surface 42.

The disk drive of FIG. 1, which is a load/unload type disk drive, includes a ramp tab 58 that is attached to the end of the flexure arm 20. The ramp tab 58 engages a ramp 60 when the actuator arm assembly 18 is unloaded from the disk surface 42. Unloading the actuator arm assembly 18 from the disk surface 42 prevents the bias from the flexure arm 20 from forcing the transducer 24 into contact with the disk 12 surface when the disk 12 is not spinning, thus helping to avoid data loss.

With reference now to FIG. 3, a diagrammatic representation illustrating a side view of a simple ramp 60 is now described. The ramp 60 has an upper ramp portion 62 and a lower ramp portion 64. Thus, when the ramp tab 58 engages the upper or lower ramp portion 62,64, it moves along the ramp 60 and into a parked position. Located at the end of the ramp 60 farthest away from the disk 12 is a crash stop 66. The crash stop 66 acts to prevent the actuator arm assembly 18 from traveling beyond its range of motion, which can cause damage to the actuator arm assembly 18.

Because the servo sector index, which relates to a circumferential position on the disk surface, is unavailable when a transducer of a load/unload drive is parked on its ramp or when a transducer of a contact start/stop drive is parked in its landing zone, it would be advantageous to provide a circumferential index relative to the disk surface prior to loading the transducer onto the disk surface. Furthermore, it would be beneficial to provide a circumferential index relative to the disk surface in the absence of a transducer reading a servo sector index from the disk surface. In addition, it would be beneficial to use a circumferential index to reduce the landing zone for a load/unload drive, so that more information can be stored on a disk surface.

SUMMARY OF THE INVENTION

The present invention is designed to minimize the aforementioned problems and meet the aforementioned, and other, needs.

A method and apparatus for generating an index location from a spin motor of a disk drive are disclosed. A disk drive includes a motor having a plurality of commutation states, wherein changes in commutation states are controlled by an FCOM signal having FCOM pulses. Ideally, when the motor is spinning at a constant speed, the time between FCOM pulses is constant. However, the inventor of the present invention has recognized that, in practice, the time between FCOM pulses, when measured more closely, is not constant due to mechanical tolerances in the motor. Accordingly, the inventor has determined that the non-constant times between FCOM pulses can be advantageously used to generate a spin motor index in a disk drive.

In one embodiment, a method is provided for generating an index in a disk drive. The method includes the steps of: (1) providing a motor having a plurality of commutation states, wherein changes in commutation states are controlled by an FCOM signal having FCOM pulses; (2) measuring times between FCOM pulses to account for mechanical tolerances in the motor; and, (3) selecting a spin motor index associated with a circumferential position about the motor based upon the measured times between FCOM pulses using a predetermined criteria. Once obtained, the spin motor index may advantageously be used for a number of purposes.

Other objects, features, embodiments and advantages of the invention will be apparent from the following specification taken in conjunction with the following drawings.

DETAILED DESCRIPTION OF THE PREFERRED EMBODIMENT

Figure 1:
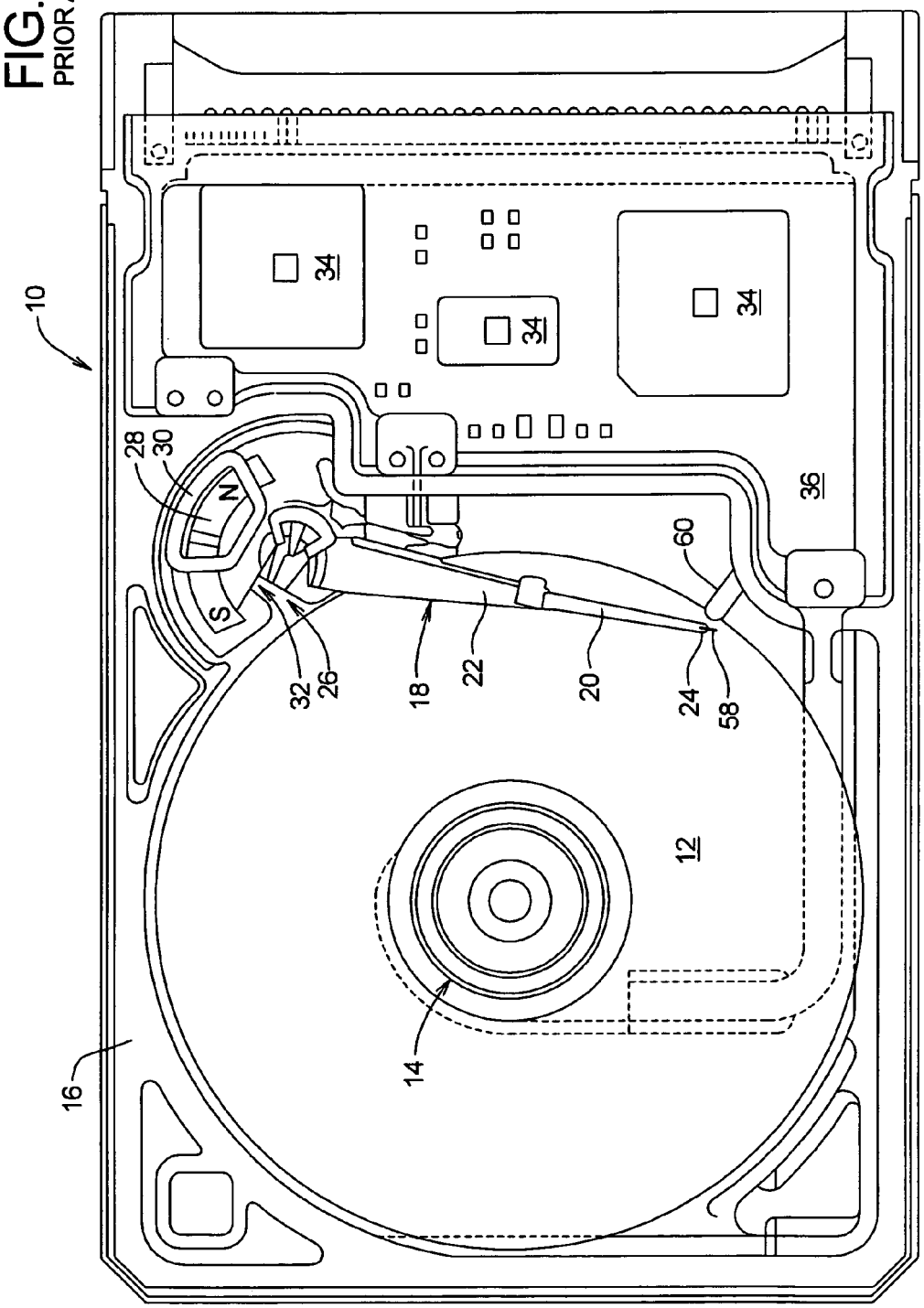
FIG. 1 is a diagrammatic representation of a conventional load/unload type disk drive.
Figure 2:
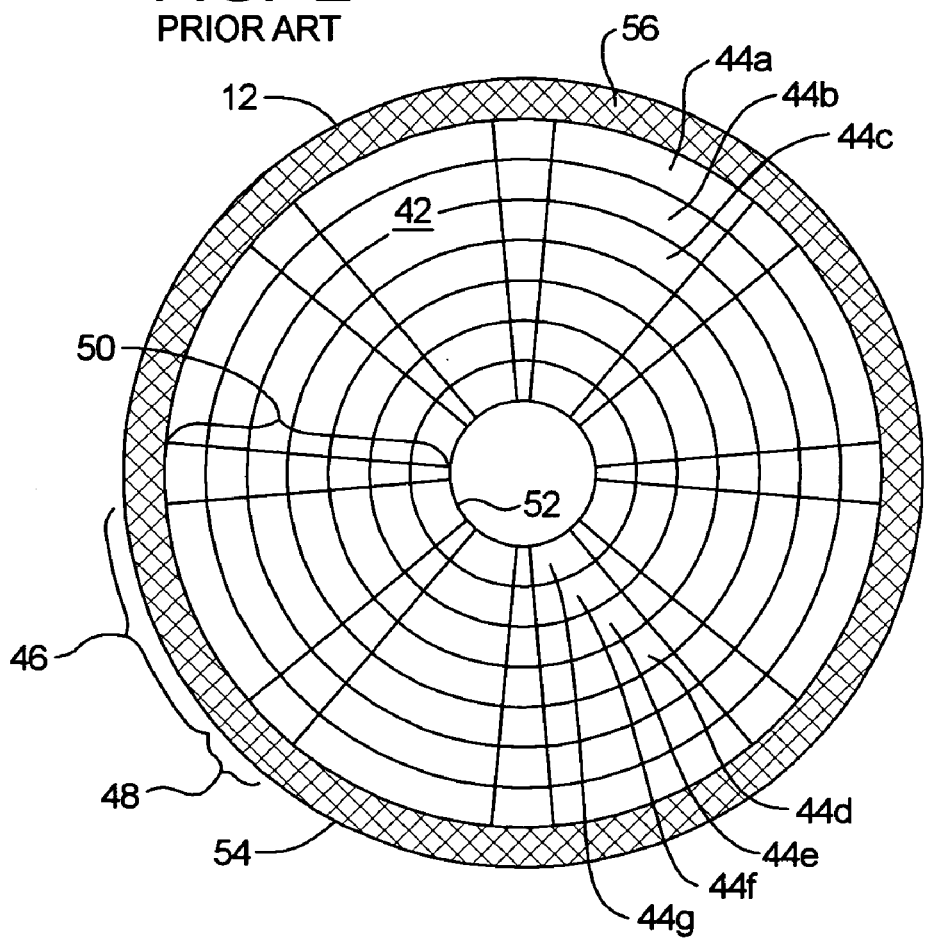
FIG. 2 is a diagrammatic representation illustrating a conventional disk surface which has been formatted to be used in conjunction with a sectored servo system.
Figure 3:
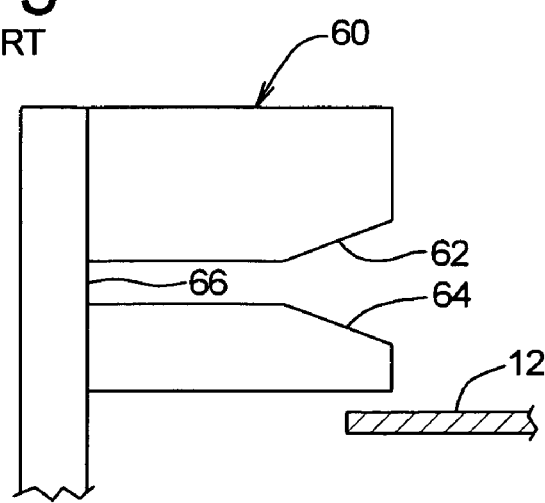
FIG. 3 is a diagrammatic representation illustrating a side view of a simple ramp.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The inventor has determined that an index may be generated in a disk drive prior to loading transducers onto the disk surface and reading servo information from the disk surface. Specifically, the inventor has determined that an index may be generated from a spin motor of a disk drive. The spin motor index (as contrasted to a servo sector index) may be advantageously used for a variety of purposes, some of which will be described below.

Figure 4:
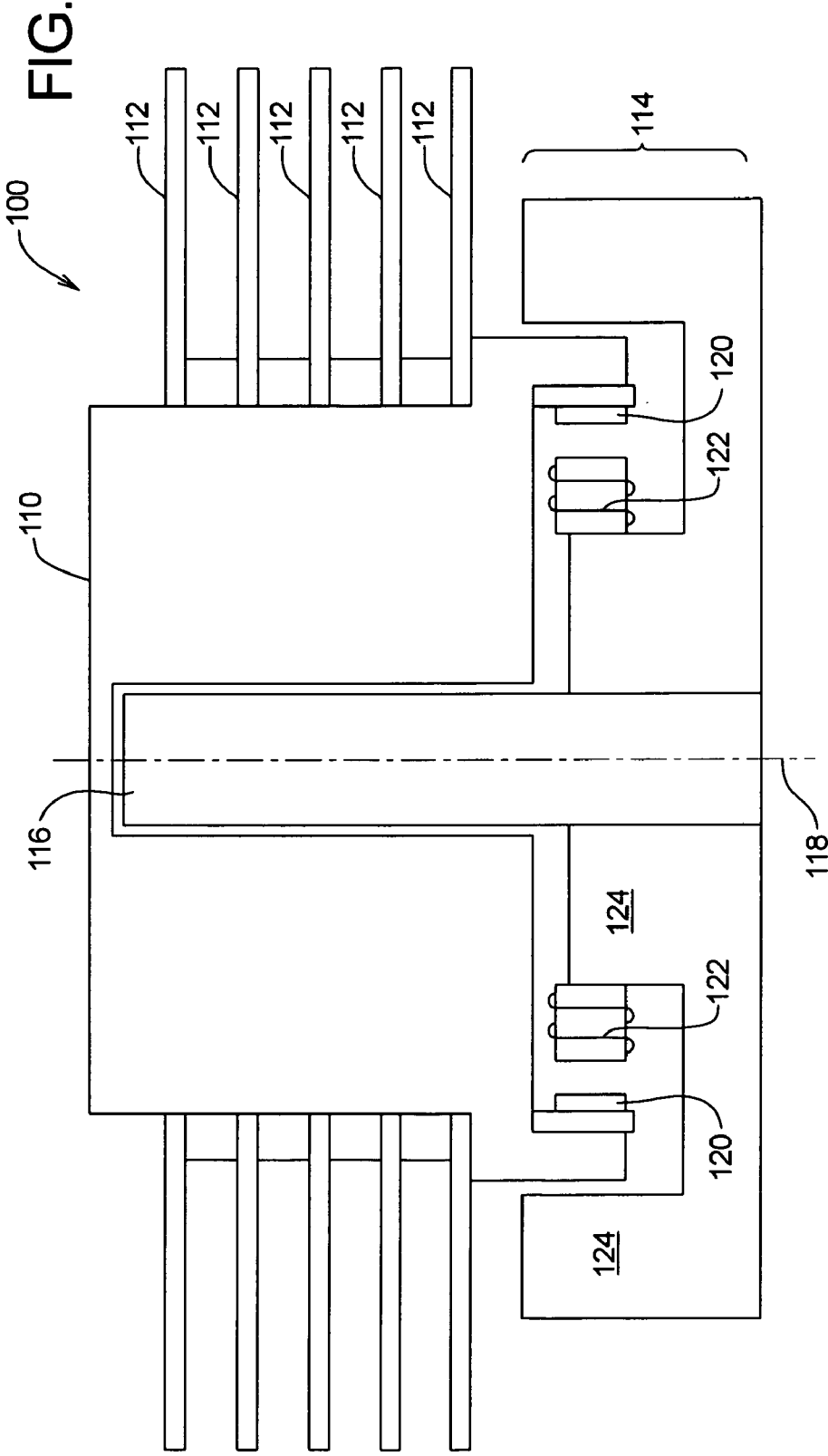
FIG. 4 is a diagrammatic representation of a simplified sectional side view of a disk drive having a spindle motor that can use the principles of the present invention.

FIG. 4 is a diagrammatic representation of a simplified sectional side view of a disk drive 100 having a spindle motor 114 that can use the principles of the present invention. The disk drive 100 includes a hub 110 that carries a plurality of magnetic storage disks 112 that are used by the disk drive 100 to store digital information. The hub 110 is rotatably coupled to a stationary spindle member 116 by some form of bearing structure (not shown) so that the hub 110 and the attached disks 112 are free to rotate about an axis of rotation 118.

As illustrated in FIG. 4, the disk drive 100 also includes an integrated spindle motor 114 for imparting rotational motion to the hub 110 and disks 112 during disk drive operation. The spindle motor 114 includes a ring magnet 120, having alternating magnet field orientations (e.g., north-south, south-north, north-south, etc.), disposed about an inner surface of the hub 110. The spindle motor 114 also includes a number of coil windings 122 fixedly attached to a stationary base portion 124 of the disk drive 100 at angular intervals. The coil windings 122 are used to generate magnetic poles within the spindle motor 114 in response to the application of drive currents to the windings 122 to initiate and maintain rotation of the spindle motor 114. In conformance with standard motor terminology, the moving portion of the spindle motor 114 (which is integral with the hub 110 and the disks 112) will be referred to herein as the "rotor" and the stationary portion of the spindle motor 114 will be referred to as the "stator."

Figure 5:
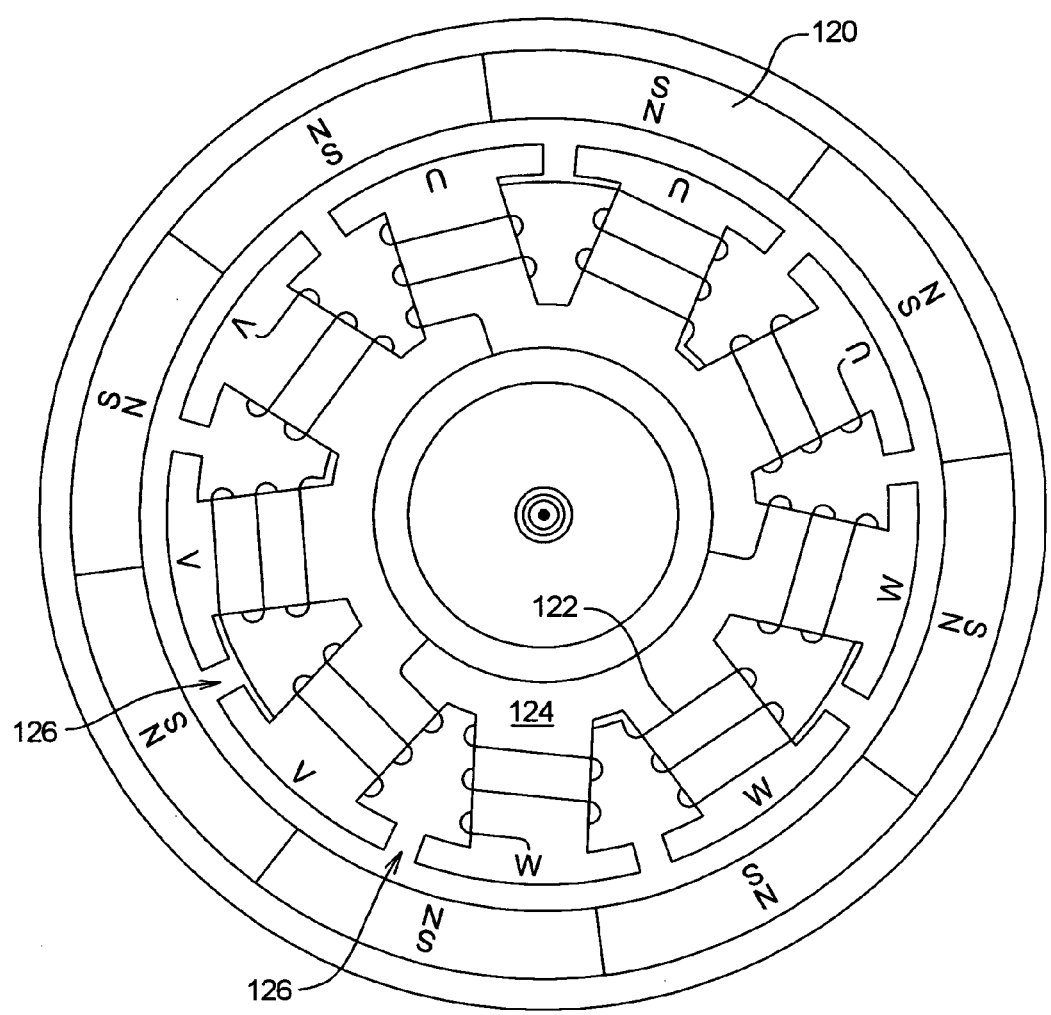
FIG. 5 is a diagrammatic representation of an exemplary brushless DC motor to more clearly illustrate its ring magnet, stator pole pieces and gaps between adjacent stator pole pieces.

FIG. 5 is a diagrammatic representation to more clearly illustrate portions of a brushless DC motor including a ring magnet 120 having alternating magnetic field orientations and coil windings 122 fixedly attached to a stationary base portion 124. FIG. 5 shows a motor with a ring magnet having eight (8) alternating magnetic field orientations and nine (9) stator pole pieces. In addition, nine (9) gaps 126 are shown between adjacent stator pole pieces.

During disk drive operation, coil windings 122 are energized in a predetermined sequence to generate a varying magnetic field within the motor 114. This varying magnetic field interacts with the magnetic fields generated by the ring magnet 120 to impart rotational motion to the rotor. As can be appreciated, the timing with which the coil windings 122 are energized is important for achieving efficient motor performance. That is, the coil windings 122 must be energized so that they create proper magnetic field orientations at proper times to facilitate rotation of the rotor. Thus, the rotational position of the rotor with respect to the stator needs to be tracked to determine when to energize the coils.

The process of varying the coil energization as the rotor spins about the axis 118 to facilitate rotation is known as "commutation" of the motor. A number of commutation "states" are generally defined to describe different coil drive arrangements that are desirably applied at different rotational positions of the rotor. During rotor rotation, the system repeatedly sequences through the commutation states based on the changing rotor position. To do this, the system identifies commutation points at which to "commutate" to a new state. Generally, commutation points are identified using the BEMF generated in the coil windings 122 during rotation.

A commutation signal, known as FCOM (which conventionally stands for "frequency of commutation"), generates pulses at the identified commutation points. Individual pulses of the FCOM signal are generally referred to as "FCOM pulses." A further explanation of the FCOM signal will be provided in connection with FIG. 7, below.

Figure 6:
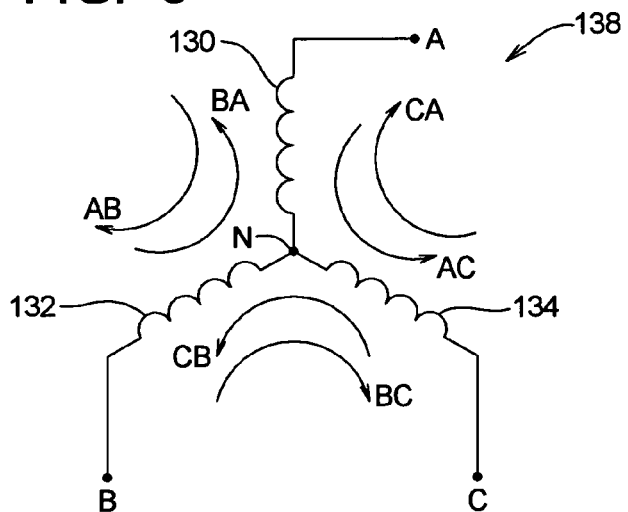
FIG. 6 is a simplified schematic diagram illustrating a number of motor coils connected in a three-phase wye arrangement.

FIG. 6 is a simplified schematic diagram illustrating a number of motor coils 130, 132, 134 connected in a three-phase wye arrangement 138. That is, coils 130, 132, 134 are each connected at one end to a common node N and at another end to a respective terminal point A, B, C. The wye arrangement 138 is typically utilized in three-phase motors to connect the coils that are used to generate the varying magnetic fields which move the rotor. Other alternative coil arrangements may also be used. A single coil within the wye arrangement 138 (e.g., coil 130, 132 or 134 in FIG. 6) can be used to generate magnetic poles at a number of different circumferential positions about the stator portion of the motor and is not limited to providing a pole at a single location. Thus, a single three-phase motor can have greater than three coil-generated magnetic poles on the stator portion.

With reference to FIG. 6, there are typically six different electrical states within a three-phase, wye connected motor. In a first electrical state AB, a spin current flows from terminal A to terminal B through coils 30 and 32. In a second state BA, current flows in the opposite direction through coils 32 and 30. In a third state BC, a spin current flows from terminal B to terminal C through coils 32 and 34. In a fourth state, current flows in the opposite direction through coils 34 and 32. In a fifth electrical state CA, a spin current flows from terminal C to terminal A through coils 34 and 30. In a sixth and final state AC, current flows in the opposite direction through coils 30 and 34. During rotation of the rotor, the motor commutes between these different states in a predetermined sequence.

Figure 7:
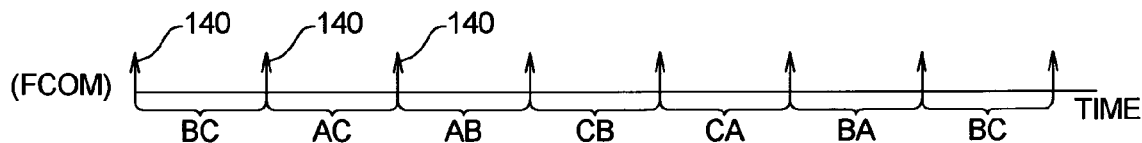
FIG. 7 is a diagrammatic representation of an FCOM signal having several FCOM pulses which are used to change energization states of the coils of the three-phase wye configuration of FIG. 6.

FIG. 7 is a diagrammatic representation of an FCOM signal having several FCOM pulses 140 which are used to change energization states of the coils of the three-phase wye configuration 138 of FIG. 6. The frequency of the FCOM pulses can be used to determine the speed of the motor and, in fact, the FCOM signal is fed back to circuitry within the disk drive to set the motor speed. (Although the FCOM signal in FIG. 7 is shown as having FCOM pulses represented as impulses, the FCOM pulses generally take the form of a square wave. Nevertheless, impulses are used for ease of illustration.)

Ideally, when the motor is spinning at a constant speed, the time between FCOM pulses is constant. However, the inventor of the present invention has recognized that, in practice, the time between FCOM pulses, when measured more closely, is not constant due to mechanical tolerances in the motor. Specifically, the inventor has recognized that the time between FCOM pulses is not constant due to the stator pole pieces not being identical in size and the gaps between pole pieces not being identical in distance. Furthermore, the inventor has recognized that the time between FCOM pulses not constant due to the alternating magnetic field portions of the ring magnet not being identical in segment size. Even further, the inventor has recognized that the mechanical tolerances of the motor vary on a drive-by-drive basis. In light of these observations, the inventor has determined that the non-constant times between FCOM pulses can be advantageously used to generate a spin motor index on a drive-by-drive basis.

When determining whether a motor is spinning at a constant rate, disk drive manufacturers attempt to factor out the mechanical tolerances and, therefore, do not measure the time between FCOM pulses to a very high degree of accuracy. In contrast, the inventor has recognized that measurement of the time between FCOM pulses to a degree of accuracy which accounts for one or more of the mechanical tolerances mentioned above is useful in generating an spin motor index.

Figure 8:
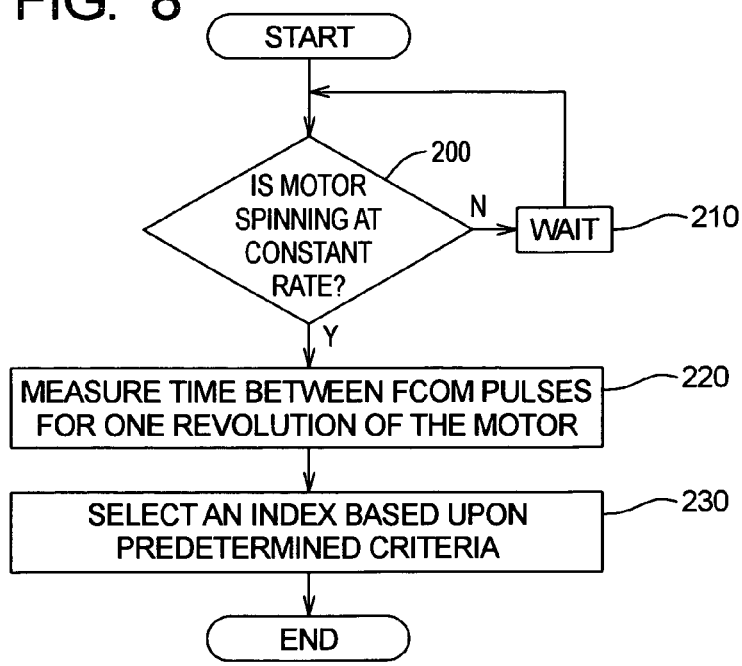
FIG. 8 is a flowchart illustrating a process of determining a spin motor index in accordance with one embodiment of the present invention; and, FIG. 9 is a disk surface from a load/unload disk drive that has a reduced landing zone as compared to conventional load/unload disk drive due to its use of a spin motor index in accordance with one embodiment of the present invention.

Reference will now be made to the flowchart of FIG. 8 to discuss one embodiment of determining a spin motor index in accordance with the present invention. In step 200, a determination is made as to whether the motor is spinning at a constant rate. Preferably, this is done according to conventional techniques which factor out mechanical tolerances. If the motor is not spinning at a constant rate, the process waits for some known or unknown time (step 210) and then again checks to see if the motor is spinning at a constant rate.

If the motor is spinning at a constant rate, highly-accurate measurements are taken of the time between FCOM pulses for one revolution of the motor (step 220). In one embodiment, there are 36 FCOM pulses in one revolution of a motor, although a different number of FCOM pulses may be possible and are expected. In one embodiment, the measurements are preferably initially stored in volatile memory, although the measurements may be initially stored in non-volatile memory.

Next, in step 230, a spin motor index is chosen using predetermined criteria based upon the measurements from step 220. As will be understood by those skilled in the art, a variety of criteria may be used. In one embodiment, the spin motor index is chosen based upon the shortest time between FCOM pulses. In another embodiment, the spin motor index is chosen based upon the longest time between FCOM pulses. In another embodiment, the spin motor index may be based upon the most unique time between FCOM pulses.

It should be noted that there are a number of ways to measure the time between FCOM pulses. In one embodiment, the FCOM signal is delivered to a processor in the disk drive which, in present-day disk drives, operates at a frequency sufficient to account for one or more of the mechanical tolerances mentioned above. As an alternative, a digital counter can be specifically included as part of the electronic circuitry of the disk drive to measure time between FCOM pulses, so as to avoid using valuable processor time. A disadvantage of the digital counter is that additional hardware is required; however, a digital counter may be designed to run at much higher clock frequencies as compared to the processor, which improves measurement resolution.

The inventor has determined that the difference between FCOM pulses is between 0.1% and 3%. Accordingly, in order to accurately measure the time between pulses for a disk drive having 36 pulses per revolution for a motor that is spinning at a constant rate of 5400 revolutions per minute, the processor (or other electronic circuitry) must have a clock that is operating at frequency of at least approximately 32 MHZ.

The requisite clock frequency may be determined by the following equation: Clock Frequency=(Motor Speed (in revs/sec)×(FCOM pulses per rev)×Resolution Factor)/(Min Diff), where Min Diff is the minimum difference between FCOM pulses and Resolution Factor is a constant which is used to set the resolution of the system. Preferably, the measurement resolution is at least 10, but other values may be used and are expected. In the above example, the Motor Speed is 90 revs/sec, the FCOM pulses per rev is 36, the Resolution Factor is 10 and the Minimum Difference between pulses is 0.1%. Accordingly, the clock frequency should be at least 32.4 MHZ (or about approximately 32 MHZ).

Once the spin motor index has been selected, software or electronic circuitry is used to monitor the FCOM pulses to keep track of the spin motor index. This can be performed by a simple counter, since the number of FCOM pulses per revolution of the motor are known.

Advantageously, the spin motor index may be used to provide a circumferential location relative to the disk surface without having to read servo information from the disk surface. This advantage may be exploited for many different purposes, some of which are described below.

Figure 9:
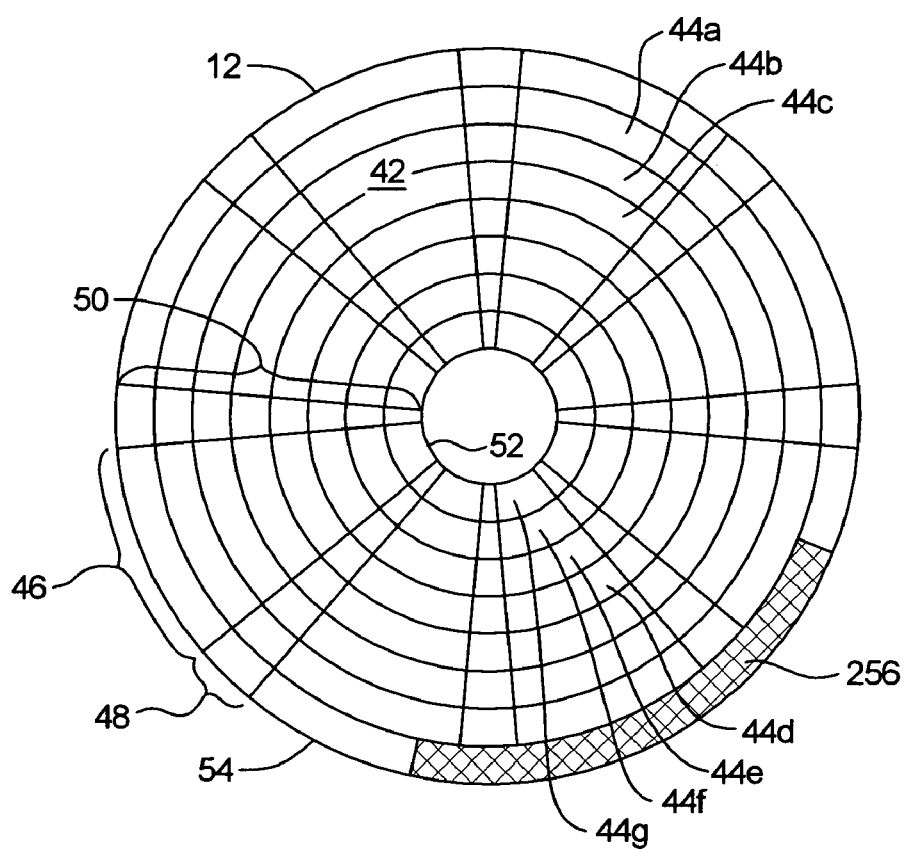

For example, the spin motor index may be used to increase the amount of information that may be stored on a disk surface. Specifically, by using a spin motor index with a load/unload drive similar to that described in connection with FIG. 1, a smaller landing zone 256 may be provided (see FIG. 9). More specifically, if the circumferential position of the landing zone is known relative to the spin motor index, the (constant) motor speed is known and the time to load a transducer from a ramp onto the disk surface is also known, the load/unload drive may be designed to load its transducer from its ramp onto its disk surface at a predetermined time after encountering the spin motor index, so that the transducer is initially be loaded over the landing zone 256 to prevent (or at least reduce the likelihood of) the transducer from contacting a data-containing area of the disk surface when being loaded.

A spin motor index may also be advantageously used in connection with self-servo writing. That is, when self-servo writing, a servo track writer is not provided to assist in positioning the transducer over the disk surface. Instead, the disk drive unit itself is used to write servo information without the assistance of a servo track writer. A spin motor index may provide valuable circumferential positioning information to assist in self-servo writing.

In one embodiment, the servo sector index of a disk drive and the spin motor index are correlated with one another after the transducer is loaded onto the disk surface. More specifically, the circumferential distance (or equivalently the time difference at a constant motor speed) between the two indexes is determined and then stored in memory. In one embodiment, the circumferential distance between the two indexes is stored in non-volatile memory (e.g., read only memory).

In one embodiment, the spin motor index is determined prior to writing servo sectors onto the disk surface, so that the spin motor index and the servo sector index are written at predetermined locations relative to one another. In one embodiment, the spin motor index and the servo sector index are at matching locations.

In case motor manufacturers become able to reduce tolerances such that clock speeds are insufficient to measure differences between FCOM pulses, an intentional asymmetry may be designed in the motor so as to create FCOM pulses of varying lengths. This asymmetry may be introduced, for example, in the regions of varying magnetic orientation in the ring magnet or in the gaps between stator pole pieces.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for generating an index in a disk drive comprising the steps of:

providing a motor having a plurality of commutation states, wherein changes in commutation states are controlled by an FCOM signal having FCOM pulses;

measuring times between FCOM pulses to account for mechanical tolerances in the motor; and, selecting a spin motor index associated with a circumferential position about the motor based upon the measured times between FCOM pulses using a predetermined criteria, wherein a predetermined number of FCOM pulses are associated with one revolution of the motor and measurements are taken between the predetermined number of FCOM pulses associated with one revolution of the motor.

2. The method of claim 1, wherein the predetermined criteria used to select the spin motor index is the shortest measured time between FCOM pulses.

3. The method of claim 1, wherein the predetermined criteria used to select the spin motor index is the longest measured time between FCOM pulses.

4. The method of claim 1, wherein the predetermined criteria used to select the spin motor index is the most unique measured time between FCOM pulses.

5. The method of claim 1, wherein the FCOM signal is delivered to a processor in the disk drive to measure times between FCOM pulses.

6. The method of claim 1, wherein the FCOM signal is delivered to a digital counter to measure times between FCOM pulses.

7. The method of claim 1, further comprising the step of:
monitoring the spin motor index using the predetermined number of FCOM pulses per revolution.

8. The method of claim 7, wherein a counter is used to monitor the spin motor index.

9. The method of claim 1, further comprising the step of:
monitoring the spin motor index.

10. The method of claim 1, further comprising the step of:
correlating the spin motor index to a circumferential position about a disk surface in the disk drive.

11. The method of claim 10, wherein the spin motor index is used in connection with writing servo information onto the disk surface.

12. The method of claim 11, wherein the servo information includes a servo sector index which is positioned relative to the spin motor index.

13. The method of claim 12, wherein the servo sector index and the spin motor index are at matching locations.

14. The method of claim 1, further comprising the step of:
correlating the spin motor index to a servo sector index written on a disk surface in the disk drive.

15. The method of claim 14, wherein the step of correlating the spin motor index to the servo sector index includes the step of determining a circumferential distance between the spin motor index and the servo sector index.

16. The method of claim 15, further comprising the step of:
storing the circumferential distance between the spin motor index and the servo sector index in memory.

17. The method of claim 1, further comprising the steps of:
providing a disk surface having a landing zone thereon;
providing a transducer operable to be loaded over and unloaded from the disk surface;
providing a ramp for parking the transducer when unloaded from the disk surface;
using the servo index when loading the transducer over the disk surface from the ramp.

18. The method of claim 17, wherein the landing zone does not extend around the entire circumference of the disk surface.

19. The method of claim 1, wherein the times between FCOM pulses are measured using an electronic device having a clock frequency greater than a predetermined value.

20. A disk drive comprising:
a motor having a rotor and a stator, wherein the rotor is rotatable relative to the stator and wherein the motor has a plurality of commutation states;
circuitry for controlling changes in the commutation states of the motor by an FCOM signal having FCOM pulses;
circuitry for measuring times between FCOM pulses to account for mechanical tolerances in the motor; and,
circuitry for selecting a spin motor index associated with a circumferential position about the motor based upon the measured times between FCOM pulses using a predetermined criteria,
wherein a predetermined number of FCOM pulses are associated with one revolution of the motor and measurements are taken between the predetermined number of FCOM pulses associated with one revolution of the motor.

21. The disk drive of claim 20, wherein the stator includes stator pole pieces and wherein times between FCOM pulses vary based upon mechanical tolerances in constructing the stator pole pieces.

22. The disk drive of claim 20, wherein the rotor includes a ring magnet having segments of alternating magnetic fields and wherein times between FCOM pulses vary based upon mechanical tolerances in constructing the segments of alternating magnetic fields in the ring magnet.

23. The disk drive of claim 20, wherein the predetermined criteria used to select the spin motor index is selected from the group consisting of: the shortest measured time between FCOM pulses; the longest measured time between FCOM pulses;
and, the most unique measured time between FCOM pulses.

24. The disk drive of claim 20, wherein the circuitry used to measure times between FCOM pulses is selected from the group consisting of: a processor in the disk drive; and, a digital counter.

25. The disk drive of claim 20, further comprising:
circuitry for monitoring the spin motor index using the predetermined number of FCOM pulses per revolution.

26. The disk drive of claim 25, wherein a counter is used to monitor the spin motor index.

27. The disk drive of claim 20, further comprising:
a disk surface fixedly connected to the rotor; and,
circuitry for correlating the spin motor index to a circumferential position about the disk surface.

28. The disk drive of claim 27, further comprising:
a transducer for writing a servo sector index onto the disk surface, wherein the transducer writes the servo sector index onto the disk surface relative to the spin motor index.

29. The disk drive of claim 28, wherein the servo sector index and the spin motor index are at matching locations.

30. The disk drive of claim 20, further comprising:
a disk surface fixedly connected to the rotor, the disk surface having a landing zone thereon;
a transducer operable to be loaded over and unloaded from the disk surface;
a ramp for parking the transducer when unloaded from the disk surface, wherein the spin motor index is used when loading the transducer over the disk surface from the ramp.

31. The disk drive of claim 30, wherein the landing zone does not extend around the entire circumference of the disk surface.

32. A method for generating an index in a disk drive comprising the steps of:
   providing a motor having a rotor and a stator, wherein the rotor has a disk surface fixedly connected thereto and wherein the rotor is rotatable relative to the stator, the disk surface having a servo sector index stored thereon; and,
   deriving a circumferential position about the motor in the absence of reading said servo sector index stored on the disk surface, wherein said circumferential position is derived using mechanical tolerances in constructing at least one of the rotor and the stator.

33. The method of claim 32, wherein said circumferential position is derived using mechanical tolerances in constructing the rotor.

34. The method of claim 32, wherein said circumferential position is derived using mechanical tolerances in constructing the stator.

35. The method of claim 32, wherein said circumferential position is derived using mechanical tolerances in constructing both the rotor and the stator.

36. A method for generating an index in a disk drive comprising the steps of:
   providing a motor having a plurality of commutation states, wherein changes in commutation states are controlled by an FCOM signal having FCOM pulses;
   measuring times between FCOM pulses to account for mechanical tolerances in the motor; and,
   selecting a spin motor index associated with a circumferential position about the motor based upon the measured times between FCOM pulses using a predetermined criteria;
   providing a disk surface having a landing zone thereon;
   providing a transducer operable to be loaded over and unloaded from the disk surface;
   providing a ramp for parking the transducer when unloaded from the disk surface;
   using the servo index when loading the transducer over the disk surface from the ramp,
   wherein the landing zone does not extend around the entire circumference of the disk surface.

37. A disk drive comprising:
   a motor having a rotor and a stator, wherein the rotor is rotatable relative to the stator and wherein the motor has a plurality of commutation states;
   circuitry for controlling changes in the commutation states of the motor by an FCOM signal having FCOM pulses;
   circuitry for measuring times between FCOM pulses to account for mechanical tolerances in the motor; and,
   circuitry for selecting a spin motor index associated with a circumferential position about the motor based upon the measured times between FCOM pulses using a predetermined criteria;
   a disk surface fixedly connected to the rotor, the disk surface having a landing zone thereon;
   a transducer operable to be loaded over and unloaded from the disk surface;
   a ramp for parking the transducer when unloaded from the disk surface, wherein the spin motor index is used when loading the transducer over the disk surface from the ramp,
   wherein the landing zone does not extend around the entire circumference of the disk surface.

\* \* \* \* \*